B. P. & F. I. REMY.
MILKING MACHINE.
APPLICATION FILED JAN. 11, 1912.
1,140,066.
Patented May 18, 1915.
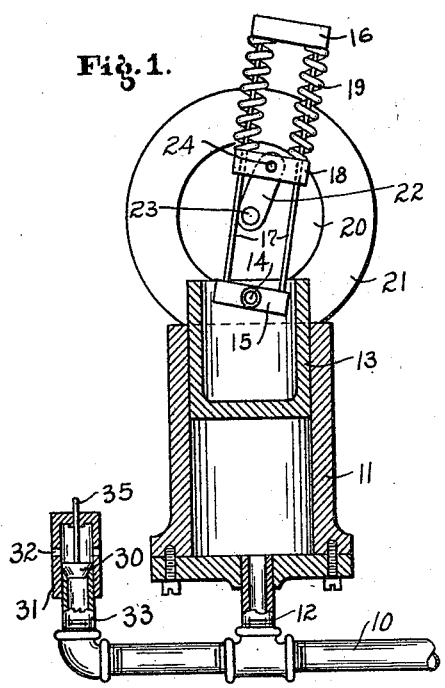
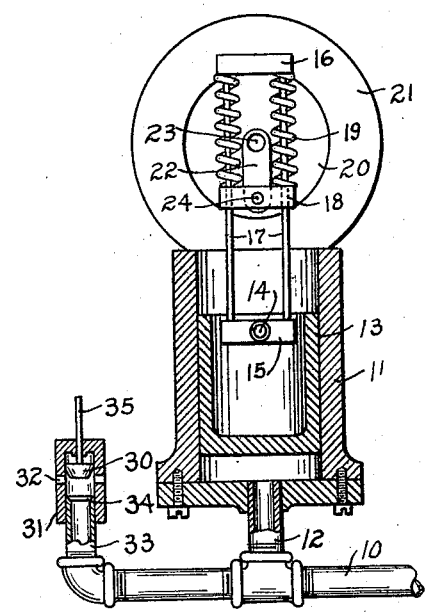
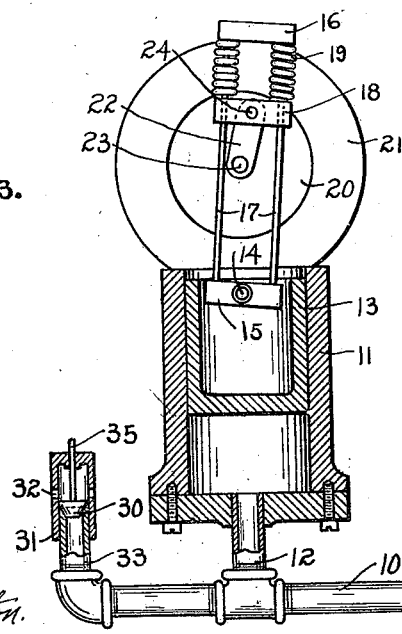
WITNESSES:
A. H. Edgerton.
E. A. Mayo.
INVENTORS
Benjamin P Remy +
Frank. I Remy.
BY
V. H. Lockwood
ATTORNEY.

UNITED STATES PATENT OFFICE.

BENJAMIN P. REMY AND FRANK I. REMY, OF ANDERSON, INDIANA.

MILKING-MACHINE.

1,140,066. Specification of Letters Patent. Patented May 18, 1915.

Application filed January 11, 1912. Serial No. 670,698.

*To all whom it may concern:*

Be it known that we, BENJAMIN P. REMY and FRANK I. REMY, of Anderson, county of Madison, and State of Indiana, have invented a certain useful Milking-Machine; and we do hereby declare that the following is a full, clear, and exact description thereof, reference being had to the accompanying drawings.

The object of this invention is to provide and improve a device in vacuum milking apparatus and relates particularly to the means for creating and controlling the desired rarefaction of the air in the milking apparatus for the satisfactory operation thereof.

The general nature of the milking apparatus as a whole is set forth in our former application Number 415,952, filed February 14, 1908.

The invention consists chiefly of a pulsating pump of simple and economical arrangement for accomplishing the object stated.

The nature of the invention will be understood from the accompanying drawings and the following description and claims.

In the drawing Figure 1 is a central vertical section through the pump and exhaust valve, associated parts being in elevation and the line pipe partly broken away, and showing the piston of the pump at one end of the stroke. Fig. 2 is the same showing the piston at the other end of the stroke and also the valve in open position. Fig. 3 is the same showing the position of the parts while the piston is being withheld by the suction action.

There is shown herein the air pipe 10 which runs from the pump to the remainder of the milking apparatus such as the milker and the milk receiver, which, however, are not here shown, but may be of any desired type or construction.

The pump consists of the cylinder 11 open at one end and closed at the other end with its closed end connected by a pipe 12 with the air pipe 10. The piston 13 is formed much like the cylinder, cup shaped, and there is a peculiarly formed piston rod construction for it consisting of a frame one end of which projects into the piston and is fulcrumed at 14. This frame consists of end bars 15 and 16 and two parallel rods 17 secured thereto and extending out beyond the piston and cylinder. A head 18 is slidably mounted on the two rods 17 and is forced inward, that is, toward the piston, by a pair of springs 19 which encircle the rods and lie between the frame bar 16 and the sliding head 18.

A machine 20 is shown with a fly wheel 21 and a shaft 23 which projects over the cylinder 11 and has secured on its end a crank 22 the outer end of which is pivoted to the sliding head 18 midway its ends.

It is thus seen that the yielding mounting of the piston will accommodate itself to the variations in the rarefaction of the air in pipe 10 and also not injure the cow's teats or udder and also cause the pulsating action of the air in the pipe 10 and therefore in the milker for properly actuating the milker so as to extract the milk more effectively. Thus in the exhaust stroke of the piston the springs 19 will be controlled as to the degree of yielding, not only by the actuating movement of the machine but by the degree of pressure of the outer air against the piston and this degree of pressure of the outer air will be controlled by the degree of rarefaction of the air in the cylinder and pipe 10. If the degree of rarefaction is comparatively considerable, the springs will yield more than when the degree of rarefaction is comparatively small.

A saftey valve 30, of gravity type for the pipe 10 being located in the casing 31 with ports 32 in the side wall thereof, the lower end of the casing is secured to the pipe 33 which is connected with pipe 10 and has the valve seat 34, a valve stem 35 being provided which extends through the top of the casing 31.

In the operation of the device after the milker is applied to the cow's udder some degree of rarefaction of the air in the milking apparatus is always maintained preferably to hold the milker in place on the udder. If the rarefaction is diminished so that the air in the milker is substantially the same as the outside air, the milker would drop off. The air may enter the system preferably at the milker and it is contemplated that between the milker and the pump preferably in connection with the milk receiver the safety valve shall be provided so that the in-stroke of the piston will not be communicated entirely to the milker. Therefore, the valve 30 is provided for yielding when the air in the pipe 10 exceeds the atmospheric pressure. The milker and piping adjacent thereto, as understood, are not directly influenced by the in-stroke of the piston, so at that point of the system, as stated above, there is always some degree of rarefaction of the air.

As noticed in Fig. 3, the piston is withheld by the suction action, and yet the device operates by reason of the large degree of the compression of the springs 19. In other words, with this device the engine can operate without the complete withdrawal of the piston, the spring 19 allowing for such withholding of the piston by the suction action in the pipe system of the device. Hence there is required a relatively great expansion and contraction of the springs 19, as compared with the normal piston movement.

The invention is not limited necessarily to the particular form shown, as it is immaterial whether the piston or cylinder moves, the same results being obtained. An important point, however, is that the springs, forming a part of the connecting rod, practically control the degree of rarefaction of the air into the device.

We claim as our invention:

1. In a milking machine, an air tube adapted to be connected with a milker, a cylinder connected with said air tube, a closed piston therein, and yielding means for causing relative movement of the cylinder and piston inversely proportionate to the rarefaction of the air in the milker tube.

2. In a milking machine, a tube adapted to be connected with the milker, a cylinder connected with the tube, a closed piston therein, a driving shaft, and yielding means for operating the piston from said driving shaft whereby the movement of the piston will be inversely proportionate to the rarefaction of the air in the milker tube.

3. In a milking machine, an air tube adapted to be connected therewith, a pump for regulating air rarefaction in the milker consisting of a cylinder connected with said air tube, a closed piston in said cylinder, a driving shaft, a frame pivoted to one end of the piston, a sliding head thereon, a crank on the driving shaft pivoted to said head for actuating the same, and yielding means on said frame for transmitting movement thereto from said head, substantially as set forth.

4. In a milking machine, a pump for regulating the air rarefaction in the milker consisting of a cylinder, a piston therein, a driving shaft with a crank thereon, a frame having a pair of parallel rods and said frame at one end pivoted to the piston, a head slidable on said rods and pivoted to the crank of the driving shaft, and springs on the outer end of said rods tending to resist the movement of said head during the outward stroke of the piston.

In witness whereof, we have hereunto affixed our signatures in the presence of the witnesses herein named.

BENJAMIN P. REMY.
FRANK I. REMY.

Witnesses:
B. M. REMY,
MARGARET W. REMY.

Copies of this patent may be obtained for five cents each, by addressing the "Commissioner of Patents. Washington, D. C."